(12) United States Patent
Tsai et al.

(10) Patent No.: US 8,220,011 B2
(45) Date of Patent: Jul. 10, 2012

(54) PROTECTION COVER OF PICK-UP HEAD

(75) Inventors: Yao-Ching Tsai, Guishan Shiang (TW); Jen-Chen Wu, Guishan Shiang (TW)

(73) Assignee: Quanta Storage Inc., Guishan Shiang (TW)

( * ) Notice: Subject to any disclaimer, the term of this patent is extended or adjusted under 35 U.S.C. 154(b) by 328 days.

(21) Appl. No.: 12/556,652

(22) Filed: Sep. 10, 2009

(65) Prior Publication Data

US 2010/0074093 A1    Mar. 25, 2010

(30) Foreign Application Priority Data

Sep. 23, 2008  (TW) ............................... 97136588 A

(51) Int. Cl.
G11B 7/00 (2006.01)
G11B 17/04 (2006.01)

(52) U.S. Cl. ...................... 720/671; 369/47.39; 720/623

(58) Field of Classification Search .......... 720/648–651, 720/658–660, 663–666, 671
See application file for complete search history.

(56) References Cited

U.S. PATENT DOCUMENTS

| 5,946,291 | A | * | 8/1999 | d'Alayer de Costemore d'Arc | 369/292 |
| 6,385,161 | B1 | * | 5/2002 | Begley | 720/671 |
| 6,430,143 | B1 | * | 8/2002 | Kajiyama et al. | 720/671 |
| 2006/0206907 | A1 | * | 9/2006 | Sekita | 720/643 |
| 2010/0223635 | A1 | * | 9/2010 | Miyata et al. | 720/620 |

FOREIGN PATENT DOCUMENTS

WO    WO 2007077679 A1 *  7/2007

* cited by examiner

Primary Examiner — Nathan Danielsen
(74) Attorney, Agent, or Firm — C. G. Mersereau; Nikolai & Mersereau, P.A.

(57) ABSTRACT

The invention provides a protection cover of a pick-up head provided on a traverse of an optical drive. A plate flatly is positioned on an upper surface of the traverse, and the plate has a slot, with one end of the slot fastened to a spindle motor to clamp a disc and the other end of the slot forming a staying part for the pick-up head to stay in a stand-by mode. The pick-up head is disposed in the slot and has an objective lens. When the objective lens stays in the staying part out of a periphery of a 12-cm disc, the protection cover crosses over the staying part to protect the objective lens.

11 Claims, 8 Drawing Sheets

PROTECTION COVER OF PICK-UP HEAD

FIELD OF THE INVENTION

The present invention relates to an optical drive, and particularly to a protection cover of a pick-up head to retrieve and write data on an optical disc by emitting laser light.

BACKGROUND

With the increasing data storage amount of optical discs, data signals on an optical disc are downsized and compact. Thus, elements of a pick-up head in the optical drive become tiny and delicate such that scratches or particles would affect the accuracy of data retrieving and writing of the pick-up head due to variations of beam reflection.

FIG. 1 shows an example of an optical drive 1 in the related art. The optical drive 1 is a slot-in optical drive, and has a traverse 3 pivoted on a hollow shell 2 to enable rotation in a small angle. The traverse 3 is provided with a spindle motor 4 and has a transmitting motor 5 on its side to rotate a screw 6 to move a pick-up head 7 engaged to the screw 6 along the radial direction of the spindle motor 4. When an optical disc 8 is slotted in from an opening 9 at the front end of the shell 2, a guiding surface 10 of the traverse 3 near the opening 9 guides the optical disc 8 to a guiding rod 11, and the guiding rod 11 guides the optical disc 8 to a position in the shell 2 to move the spindle motor 4 to clamp and rotate the optical disc 8. Thus, the pick-up head 7 can move for retrieving and writing data on the optical disc 8.

However, when the optical drive 1 is in the stand-by mode before the optical disc 8 is slotted in, the traverse 3 moves downwards and slantingly lies on the bottom of the shell 2 to enable the optical disc 8 to slot in. Meanwhile, the objective lens 12 on the pick-up bead 7 stays at a position near the end of the guiding surface 10 on the traverse 3, which is within the periphery of a 12-cm optical disc, to enable positioning of the pick-up head 7. In this way, the optical disc 8 slotted in the optical drive 1 would easily contract to the objective lens 12 of the pick-up head 7. In some optical drives 1, the guiding surface 10 is formed near the objective lens 12, as shown in the dotted line, as protection. However, the objective lens 12 must be exposed to prevent the guiding surface 10 from contacting to the rotating optical disc. This problem is more critical in the slim type optical drive 1 which has a lower guiding surface 10, where the optical disc 8 contacts the objective lens 12 in a higher rate to scratch and damage the objective lens.

In addition, the objective lens 12 stays at a position within the periphery of the optical disc 8, which has a 12 cm diameter, such that the optical disc 8 covers the objective lens 12 to avoid laser beam projected from the objective lens 12 to leak out when the pick-up head 7 is activated. However, the optical disc 8 has a consistent reflective rate, and once the pick-up head 7 is deviate from the regular position due to contact, vibration or tooth leaping, the position of the pick-up head 7 in relation to the optical disc 8 is inaccurate due to the reflection of the beam. In some optical drives 1, the position of the pick-up head 7 can be affirmed by the immediate vibration or electrical variation of tooth leaping caused by the pick-up head 7 hitting the spindle motor 4, and the pick-up head 7 is then moved to a starting position within the inner predetermined radius of optical disc 8. In this way, however, accuracy of the elements may be damaged and noise problem exists. Hence there is a problem to be solved in the protection structure of the pick-up head.

SUMMARY OF THE INVENTION

An objective of the present invention is to provide a protection cover of a pick-up head to move the objective lens of the pick-up head out of the periphery of the optical disc. The protection cover covers the objective lens to protect it from being damaged by contact.

A further objective of the present invention is to provide a protection cover of a pick-up head. The protection cover provide a mark of a specific reflection lightness for positioning the pick-up head.

A further objective of the present invention is to provide a protection cover of a pick-up head formed integratedly with the traverse to cover the objective lens of the pick-up head to simplify the design of the protection cover.

In order to achieve the foregoing objectives of the invention, a protection cover of a pick-up head is provided on a traverse of an optical drive. A plate flatly is positioned on an upper surface of the traverse, and the plate has a slot, with one end of the slot fastened to a spindle motor to clamp a disc and the other end of the slot forming a staying part for the pick-up head to stay in a stand-by mode. The pick-up head is disposed in the slot and has an objective lens. When the objective lens stays in the staying part out of a periphery of a 12-cm disc, the protection cover crosses over the staying part to protect the objective lens.

In an embodiment of the present invention, the protection cover can be designed for staying and zeroing positioning of the pick-up head by reflection lightness of the protection cover in ways of providing the protection cover made from metal or plastic or forming a positioning point comprising a mark, color or painting layer to change the reflection lightness. In addition, the protection cover can be a thin flat board, and can be fixed on the traverse by a screw. The plate can form a ladder-shaped extrusion to form a guiding surface at the end of the staying part and out of the periphery of the 12-cm disc along the periphery, and the extrusion is of an equal height to the protection cover. A wear protection layer can be adhered on the guiding surface and the protection cover. The protection cover can integratedly extend from the guiding surface to cover the objective lens.

DETAILED DESCRIPTION OF THE INVENTION

The techniques employed by the present invention to achieve the foregoing objectives and the effects thereof are described hereinafter by way of examples with reference to the accompanying drawings.

Figure 1:
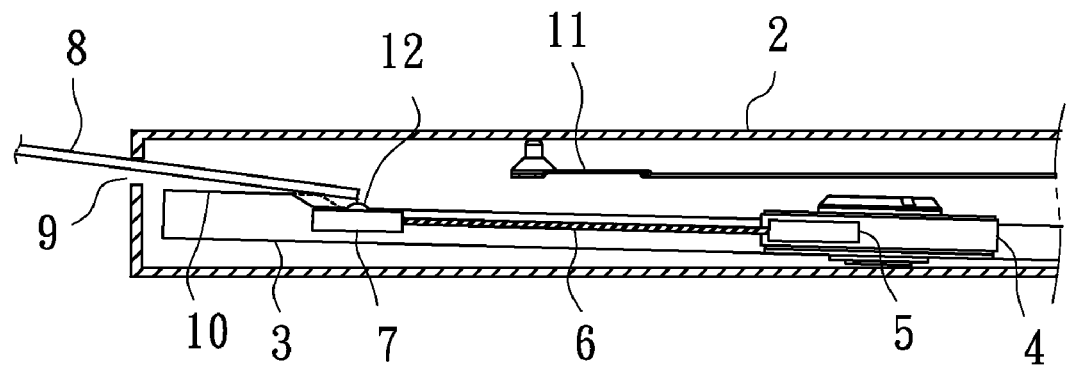
FIG. 1 is a sectional view of a slot-in optical drive in the related art.
Figure 2:
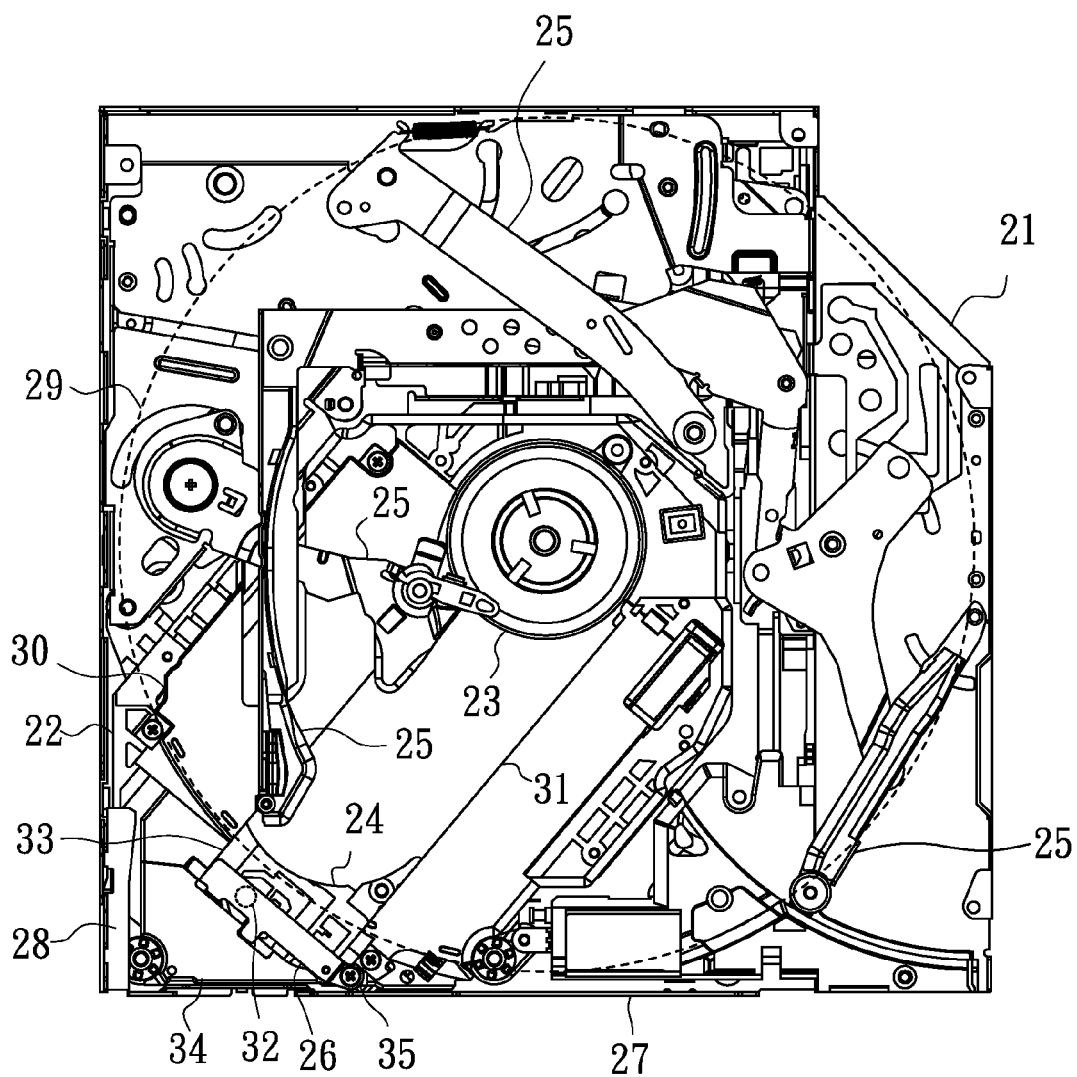
FIG. 2 is an upper view of an optical drive according to a first embodiment of the invention.

FIG. 2 is an upper view of an optical drive 20 according to a first embodiment of the invention. The optical drive 20 is a slot-in optical drive, which comprises a shell 21, a traverse 22, a spindle motor 23, a pick-up head 24, a plurality of guiding rods 25, and a protection cover 26. The shell 21 is hollow and has a front end opening 27. The traverse 22 is disposed in the hollow shell 21 and pivoted to the end near the opening 27 to form a pivot end 28 to enable rotation in a small angle. The spindle motor 23 is provided at the other end of the traverse 22 to rotate an optical disc 29 as shown in the dotted line. A plate 30 is flatly positioned on an upper surface of the traverse 22, and the plate 30 has a long slot 31 along the radial direction of the spindle motor 23. One end of the slot 31 is fastened to the spindle motor 23.

The pick-up head 24 is provided in the slot 31 and can move along the slot 31. The pick-up head 24 has an objective lens 32 to project a laser beam onto the optical disc 29. When the optical drive 20 is in a stand-by mode, the other end of the slot 31 opposite to the spindle motor 23 forms a staying part 33 for the pick-up head 24 to stay in. The objective lens 32 of the pick-up head 24 stays in the staying part 33 out of a periphery of the 12-cm disc 29. The plate 30 forms a ladder-shaped extrusion to form a guiding surface 34 at the end of the staying part 33 and out of the periphery of the 12-cm disc 29 along the periphery. The guiding rods 25 are disposed in the shell 21 above the traverse 22 to swing and to guide the optical disc 29.

Figure 3A:
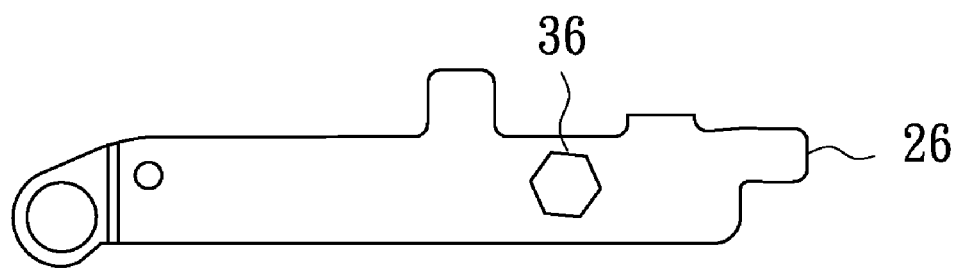
FIGS. 3(a), 3(b) and 3(c) are rear views of a protection cover according to the first embodiment of the invention.
Figure 3B:
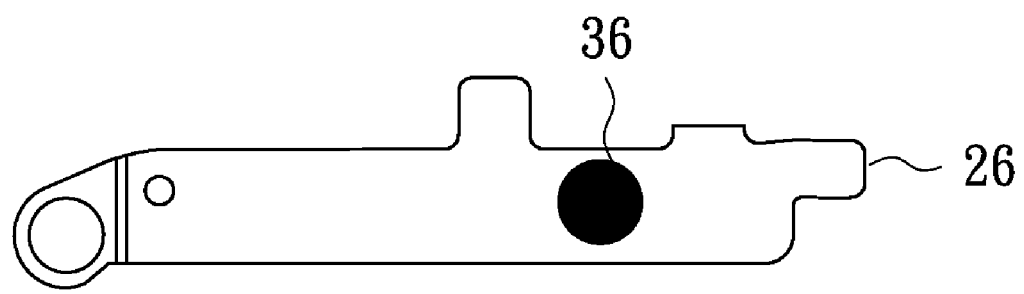
Figure 3C:
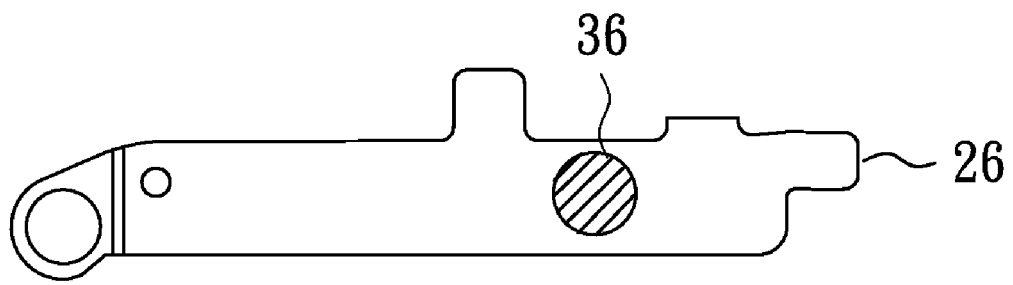

In the first embodiment, the protection cover 26 is a thin flat board crossing over the staying part 33 and fixed to the traverse 22. The periphery of the protection cover 26 is fixed to the traverse 22 at the end of the slot 33, and the protection cover 26 is of an equal height to the guiding surface 34. The protection cover 26 crosses over and covers the objective lens 32 to cover the laser beam projected. The protection cover 26 can be fixed on the traverse 22 by a screw 35, but is not limited to the screw 35 structure; that is, the protection cover 26 can be fixed on the traverse 22 by welding or adhering. The protection cover 26 can be made from metal or plastic, which has different beam reflective characteristics from that of the optical disc 29, so the positional characteristics can be differentiated for staying and zeroing positioning of the pick-up head 24. To increase the differentiation, the protection cover 26 may form a positioning point 36 at a position opposite to the objective lens 32, as shown in FIG. 3. For example, FIG. 3(a) shows a mark, FIG. 3(b) shows color and FIG. 3(c) shows a coating layer to change the reflection lightness of the positioning point 36.

Figure 4:
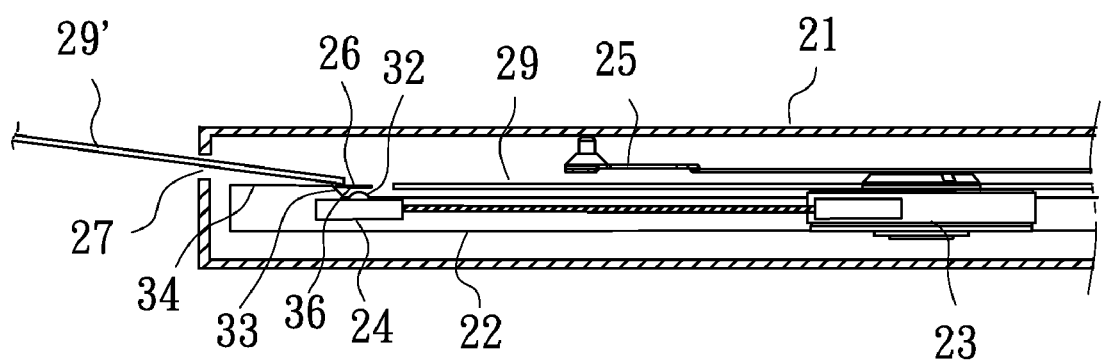
FIG. 4 is a schematic view showing operation of the optical drive according to the first embodiment of the invention.

FIG. 4 shows the operation of the optical drive 20 of the invention. When an optical disc 29' is slotted in the opening 27 at the front end of the shell 21, the guiding surface 34 guides the front end of the optical disc 29' to enter the optical drive 20. The objective lens 32, under covering of the protection cover 26, would not contact the optical disc 29', thus preventing the objective lens 32 from damage. The optical disc 29' continues entering the optical drive 20 and is guided by the guiding rods 25 to a predetermined position. Then the traverse 22 moves upward and rotates around the pivoted end to move the spindle motor 23 to clamp and rotate the optical disc 29' (as shown in the dotted line in FIG. 4). The pick-up head 24, originally positioned in the staying part 33, performs zero positioning of the objective lens 32 by reflective lightness of the positioning point 36 of the protection cover 26, and then accurately moves in a predetermined distance to the inner read/write starting position of the optical disc 29. Then, the pick-up head 24 is activated to retrieve and write data on the optical disc 29.

Figure 5:
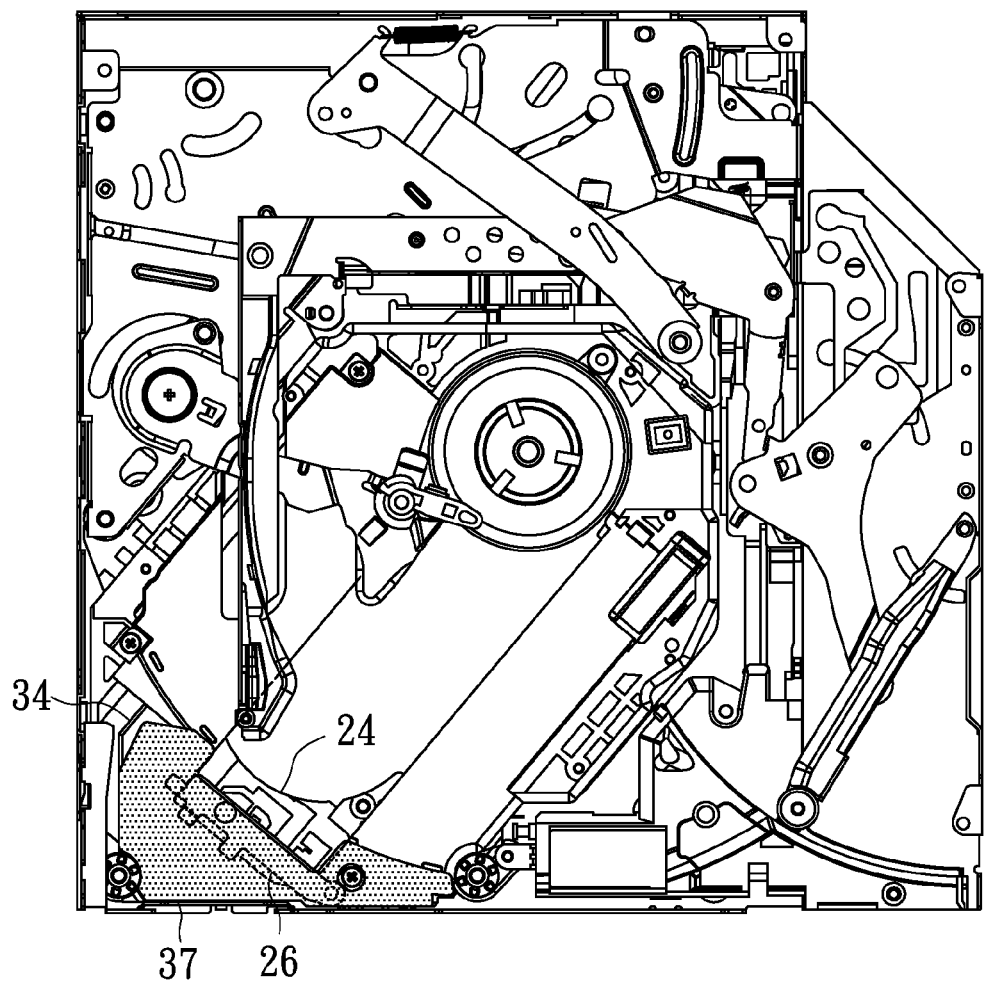
FIG. 5 is an upper view of an optical drive according to a second embodiment of the present invention.

FIG. 5 shows an optical drive according to a second embodiment of the present invention. To simplify the numerals of the elements, the second embodiment applies same numerals to the same elements in the first embodiment. The basic structure of the second embodiment is similar to that in the first embodiment. In the first embodiment, the protection cover 26 is a thin flat board crossing over the pick-up head 24, and forms a gap from the guiding surface 34, so there is fear that guidance to the slot-in of the optical disc may be affected or that scratching of the optical disc may happen. Therefore, in the second embodiment, a wear protection layer 37, such as a flannelette cloth or a plastic layer, is adhered on the guiding surface 34 and the protection cover 26, as shown by the shaded surface in FIG. 5. The wear protection layer 37 on the guiding surface 34 would cover the guiding surface 34 and the protection cover 26 continuously from the opening 27 toward the inner end of the protection cover 26 in the optical drive 20. Thus, a continuous guiding surface is formed to smoothly guide the optical disc to slot in.

Thus, the protection cover of the pick-up head of the invention covers the objective lens Out of the periphery of the optical disc to protect it from being damaged by contact. Further, the protection cover provides a positioning point to change the reflection lightness for zero positioning detection of the pick-up head.

Figure 6:
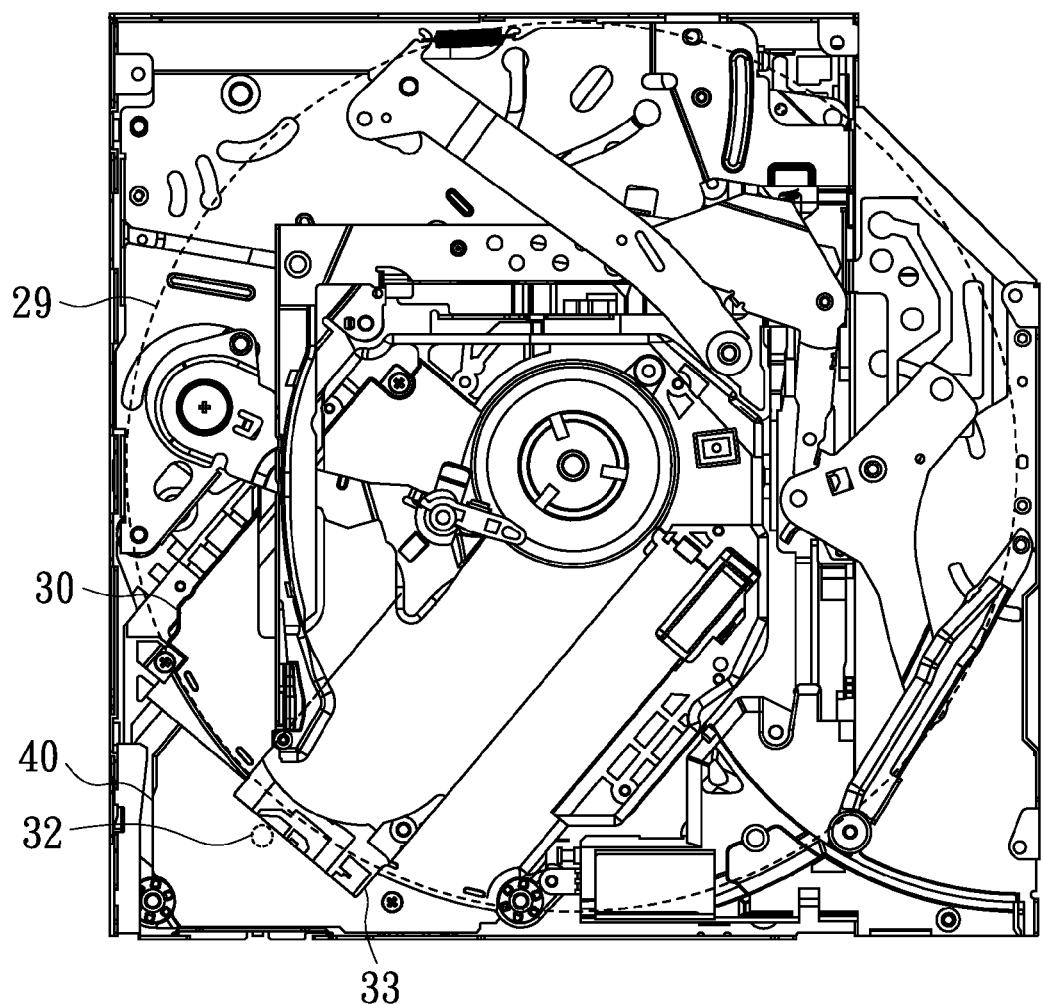
FIG. 6 is an upper view of the optical drive according to the third embodiment of the present invention.

FIG. 6 shows an optical drive according to a third embodiment of the present invention. To simplify the numerals of the elements, the third embodiment applies same numerals to the same elements in the first embodiment. The basic structure of the third embodiment is similar to that in the first embodiment. The difference exists in that the guiding surface 38 of the plate 30 integratedly extends toward the staying part 33 to form the protection cover that covers the objective lens 32 out of the periphery of the 12-cm optical disc 29.

In the third embodiment of the present invention, the protection cover is formed by extension of the plate on the upper surface of the traverse to cover the objective lens of the pick-up head, thus reducing the manufacturing and element cost of the protection cover and simplifying the structure of the optical drive. Furthermore, the embodiments of the invention utilize slot-in optical drives as the examples to describe the invention. However, the invention is not limited to slot-in optical drives. In a tray optical drive, the pick-up head is exposed with the tray and may be contacted or deviated more easily. Thus, the protection cover of the invention can be utilized in the tray optical drive to reduce the opportunity that the pick-up head is contacted or deviated and to position the pick-up head by the positioning point when contacted or deviated The preferred embodiments of the present invention have been disclosed in the examples. However the examples should not be construed as a limitation on the actual applicable scope of the invention, and as such, all modifications and alterations without departing from the spirits of the invention and appended claims shall remain within the protected scope and claims of the invention.

What is claimed is:

1. A protection cover of a pick-up head provided on a traverse of an optical drive, the optical drive including a plate flatly positioned on an upper surface of the traverse, the plate having a slot, one end of the slot fastened to a spindle motor to clamp an optical disc and the other end of the slot forming a staying part for the pick-up head to stay in a stand-by mode, the pick-up head disposed in the slot and having an objective lens, the protection cover characterized such that:

when the objective lens stays in the staying part out of a periphery of a 12-cm disc, the protection cover crosses over the staying part to protect the objective lens; and wherein the staying part provides the pick-up head for staying and zero positioning the pick-up head based on light reflected by the protection cover to the pick-up head.

2. A protection cover of a pick-up head according to claim 1, wherein the protection cover is made from metal or plastic and has different beam reflective characteristics from that of the optical disc.

3. A protection cover of a pick-up head according to claim 1, wherein the protection cover forms a positioning point at a position opposite to the objective lens.

4. A protection cover of a pick-up head according to claim 3, wherein the positioning point is a mark, color or painting layer to change the reflection lightness.

5. A protection cover of a pick-up head according to claim 1, wherein the protection cover is a thin flat board.

6. A protection cover of a pick-up head according to claim 5, wherein one end of the protection cover is fixed on the traverse by a screw.

7. A protection cover of a pick-up head according to claim 1, wherein the plate forms a ladder-shaped extrusion to form a guiding surface at the end of the staying part and out of the periphery of the 12-cm disc along the periphery, and the extrusion is of an equal height to the protection cover.

8. A protection cover of a pick-up head according to claim 7, wherein a wear protection layer is adhered on the guiding surface and the protection cover.

9. A protection cover of a pick-up head according to claim 8, wherein the wear protection layer is a flannelet cloth or a plastic layer.

10. A protection cover of a pick-up head according to claim 7, wherein the protection cover extends from the guiding surface to cover the objective lens.

11. A protection cover of a pick-up head according to claim 1, wherein the optical drive is a slot-in optical drive.

* * * * *